United States Patent [19]

Straley et al.

[11] 3,993,637

[45] Nov. 23, 1976

[54] CHELATABLE TRIAZOLYLAZO-N-ALKYL(CYCLOALKYL)ACYLACETAMIDE DYES

[75] Inventors: James M. Straley; John G. Fisher, both of Kingsport, Tenn.

[73] Assignee: Eastman Kodak Company, Rochester, N.Y.

[22] Filed: July 7, 1975

[21] Appl. No.: 593,347

[52] U.S. Cl. .......................... 260/157; 260/146 R; 8/2.5 R; 8/31; 8/42 R; 8/46; 8/52; 427/151
[51] Int. Cl.$^2$ .................. C09B 29/32; C09B 45/48
[58] Field of Search .................. 260/157, 146 R

[56] References Cited
UNITED STATES PATENTS 2,840,552   6/1958   Sureau et al. ............... 260/157 X

FOREIGN PATENTS OR APPLICATIONS 973,356   10/1964   United Kingdom ............ 260/146 R Primary Examiner—Charles F. Warren
Attorney, Agent, or Firm—Daniel B. Reece III; Donald W. Spurrell

[57] ABSTRACT

Disclosed are novel triazolylazo-N-alkyl(cycloalkyl)acylacetamide dye compounds which are colorless in solution but develop a yellow color when treated with ionic nickel such as nickel salts of organic acids or cobalt salts. This property is useful in conventional dyeing procedures and in reprographic processes wherein the dye compound is in hydrocarbon media when development of the color occurs.

4 Claims, No Drawings

CHELATABLE TRIAZOLYLAZO-N-ALKYL(CYCLOALKYL)ACYLACETAMIDE DYES

This invention concerns novel triazolylazo-N-alkyl(cycloalkyl)acylacetamide dye compounds which are colorless in solution but develop a yellow color when treated with ionic nickel such as nickel salts of organic acids or cobalt salts. This property is useful in conventional dyeing procedures and in reprographic processes wherein the dye compound is in hydrocarbon media when development of the color occurs.

This invention is concerned with azo dye compounds of the following general structure:

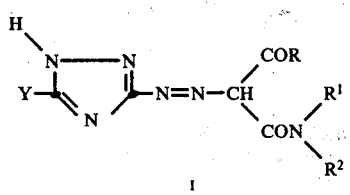

wherein:
R is straight or branched alkyl of 1–4 carbons;
$R^1$ is straight or branched alkyl of 4–8 carbons or cyclohexyl;
$R^2$ is hydrogen or straight or branched alkyl of 4–8 carbons or cyclohexyl; and
Y is straight or branched alkyl of 1–4 carbons, phenyl or hydrogen.

The dyes of our invention are colorless, or show only faint color, either in solution in organic solvents or dyed on cellulose acetate fiber such as Estron or Arnel; however, when a solution of the dyes is treated with, for example, the nickel or cobalt salt of an organic acid, for example, fatty acids of the formula $C_nH_{2n+1}COOH$, such as nickel or cobalt pelargonate, a deep yellow color results. The concentration of Ni ions is not critical and a 1/1 ratio of dye compound molecules/Ni ion is adequate although greater or lesser ratios may be employed. These dyes exhibit excellent light, sublimation, wash, and gas fastness, crock resistance and dye take up.

Preferred dye compounds of the present invention have the formula:

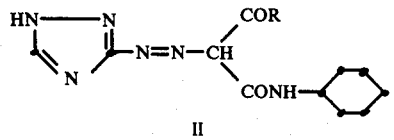

wherein R is straight or branched alkyl of 1–4 carbons.

In practicing the present invention, the chelatable compounds are prepared by diazotizing the aminotriazole and coupling with the desired coupler. A solution of the dye in benzene, or other aromatic hydrocarbon, is colorless but, when treated, for example, with a benzene solution of nickel pelargonate, a yellow color develops quickly. As a variation, the chelatable compound, when placed on cellulose acetate fabric by conventional aqueous dispersion techniques, gives a colorless or only faintly colored fabric. Treatment of the fabric with aqueous nickel thiocyanate solution, for example, and then steaming, gives bright yellow shades.

Fast yellow shades are also obtained when the dyes are applied to nickel-containing polypropylene by conventional methods.

A particularly useful area for the present dyes is in carbonless copy paper wherein the dye or the chelating metal salt is microencapsulated to be released by pressure. Such reprographic techniques are extensively discussed, for example, in a 1963 graduate study entitled Microencapsulation, and the patents cited therein, the title page of which publication accompanies this application for the convenience of the Patent Office. Some of the relevant patent disclosures in this field are U.S. Pat. Nos. 2,562,182; 2,665,228; 2,800,457; 2,800,458; 2,846,971; 2,907,682; 2,969,330; 2,969,331; 3,015,128; 3,041,289; and 3,063,865.

In order for the azo compounds to be useful in the microencapsulation process as described above, certain solubility requirements in hydrocarbon solvents must be met. The azo compounds of this invention meet these solubility requirements whereas the corresponding azo compounds from acylacetanilides do not have sufficient solubility in the hydrocarbon medium.

The general preparation of the chelatable compounds is as given in the following specific examples.

EXAMPLE 1

Preparation of N-cyclohexylacetoacetamide.

A solution of diketene (42 g.) in benzene (74 ml.) is added dropwise with vigorous stirring to a solution of cyclohexylamine (49.6 g.) in benzene (125 ml.). The rate of addition is adjusted so that a gentle reflux is maintained. The benzene is removed under vacuum and the yellow oil crystallizes upon trituation with hexane. A yield of 88.7 g. of product melting at 66°–69° C. is obtained.

EXAMPLE 2

Preparation of N-cyclohexylpivaloylacetamide.

Ethylpivaloylacetate (172 g.), cyclohexylamine (99 g.), triethanolamine (1 g.) and toluene (200 ml.) are mixed in a distillation flask and heated at reflux under a 6 in. Vigreux distillation column. When the head temperature stabilized at 82° C. distillation was begun at a take off to reflux ratio of 1 to 10. Distillation was continued until a head temperature of 110° C. is obtained. The remainder of the solvent is removed in a vacuum and residue is crystallized by trituation with hexane. A yield of 201 g. of product melting at 69°–70° C. is obtained.

EXAMPLE 3

Preparation of an Azo Compound.

A solution of 3-amino-1(H),1,2,4-triazole (4.2 g.) in acetic acid (150 ml.) and water (25 ml.) is treated with sulfuric acid (5.2 ml.) and then cooled to 3° C. A solution of nitrosyl sulfuric acid prepared from NaNO₂ (3.6 g.) and $H_2SO_4$ (20 ml.) is then added keeping the temperature below 7° C. After stirring at 3° to 8° C. for 2½ hr. a solution of N-cyclohexylpivaloylacetamide (11.3 g.) in 1-5 acid (50 ml.) is added keeping the temperature below 10° C. This coupling mixture is poured onto NH₄OH (250 ml.) and sufficient ice so that some remains after addition is complete. The azo compound separates almost immediately and after 1 hr. it is collected, washed with water and dried. It has the following probable formula:

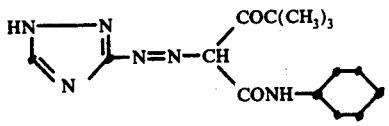

EXAMPLE 4

The coupler of Example 3 is replaced by N-cyclohexylacetoacetamide and the following dye is obtained:

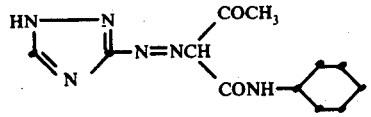

Typical compounds of the present invention are given in the following table referring to Formula I above.

Table I

| Y | R | R$^1$ | R$^6$ |
|---|---|---|---|
| H | CH$_3$ | C$_4$H$_9$ | C$_4$H$_9$ |
| H | CH(CH$_3$)$_2$ | H | cyclohexyl |
| H | —C—(CH$_3$)$_3$ | H | CH$_2$—CH(CH$_3$)—C$_2$H$_5$ |
| C$_2$H$_5$ | CH$_3$ | H | cyclohexyl |
| C$_6$H$_5$ | CH$_3$ | H | cyclohexyl |
| C$_4$H$_9$ | CH(CH$_3$)(C$_2$H$_5$) | H | cyclohexyl |

Table I-continued

| Y | R | R$^1$ | R$^6$ |
|---|---|---|---|
| H | H | CH$_3$ CH$_2$CHC$_2$H$_5$ | CH$_3$ CH$_2$CHC$_2$H$_5$ |

Although the invention has been described in considerable detail with particular reference to certain preferred embodiments thereof, variations and modifications can be effected within the spirit and scope of the invention.

We claim:

1. A chelatable compound of the formula

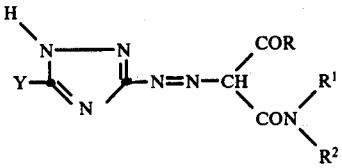

wherein:
R is straight or branched alkyl of 1–4 carbons;
R$^1$ is straight or branched alkyl of 4–8 carbons or cyclohexyl;
R$^2$ is hydrogen or straight or branched alkyl of 4–8 carbons or cyclohexyl; and
Y is straight or branched alkyl of 1–4 carbons, phenyl or hydrogen.

2. A chelatable compound of the formula

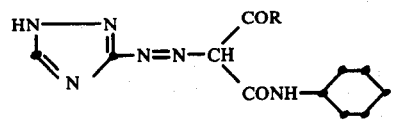

wherein R is straight or branched alkyl of 1–4 carbons.

3. The compound of claim 2 wherein R is —C(CH$_3$)$_3$.
4. The compound of claim 2 wherein R is —CH$_3$.

* * * * *